United States Patent
Lim

(10) Patent No.: US 7,643,494 B2
(45) Date of Patent: Jan. 5, 2010

(54) INTERWORKING APPARATUS AND METHOD FOR ACCEPTING IP IN WCDMA SYSTEM

(75) Inventor: Jong-Keun Lim, Gyeonggi-Do (KR)

(73) Assignee: LG-Nortel Co., Ltd., Seoul (KR)

( * ) Notice: Subject to any disclaimer, the term of this patent is extended or adjusted under 35 U.S.C. 154(b) by 754 days.

(21) Appl. No.: 11/290,438

(22) Filed: Dec. 1, 2005

(65) Prior Publication Data

US 2006/0120388 A1 Jun. 8, 2006

(30) Foreign Application Priority Data

Dec. 6, 2004 (KR) .................. 10-2004-0101714

(51) Int. Cl.
*H04L 12/56* (2006.01)
(52) U.S. Cl. .................. 370/395.6; 370/401
(58) Field of Classification Search .......... 370/395.1, 370/352, 310.2, 310.1, 396, 395.54, 410, 370/401, 395.6
See application file for complete search history.

(56) References Cited

U.S. PATENT DOCUMENTS

| | | | |
|---|---|---|---|
| 6,487,203 B1* | 11/2002 | Chung et al. ............ | 370/395.1 |
| 7,088,723 B2 | 8/2006 | Yang | |
| 7,283,490 B2* | 10/2007 | Peng ...................... | 370/310.1 |
| 7,327,739 B1* | 2/2008 | Holmgren et al. ...... | 370/395.54 |
| 2003/0219010 A1* | 11/2003 | Peng ...................... | 370/352 |
| 2004/0001451 A1* | 1/2004 | Bernheim et al. ....... | 370/310.2 |
| 2005/0213590 A1* | 9/2005 | Hauenstein et al. ..... | 370/401 |
| 2007/0263636 A1* | 11/2007 | Chen et al. .............. | 370/396 |
| 2008/0310438 A1* | 12/2008 | Jabri et al. .............. | 370/410 |

FOREIGN PATENT DOCUMENTS

| | | | |
|---|---|---|---|
| CN | 1371206 | | 9/2002 |
| CN | 1430355 | | 7/2003 |
| EP | 1365609 A1 | * | 11/2003 |
| EP | 1575223 | * | 9/2005 |
| WO | WO0044191 | * | 7/2000 |
| WO | WO0191399 | * | 11/2001 |
| WO | WO0243332 | * | 5/2002 |
| WO | WO02052884 | * | 7/2002 |

OTHER PUBLICATIONS

Rfc 2320; Greene et al. Apr. 1998.*
Adaptive and integrated video communications or wireless ATM in WCDMA systems; Zhou et al.; 2001.*
The impact of IPv6 on wireless networks; Worrall, K P; Mar. 2001.*
Chinese Office Action dated Nov. 7, 2008 with English Translation.

* cited by examiner

*Primary Examiner*—Ayaz R Sheikh
*Assistant Examiner*—Salman Ahmed
(74) *Attorney, Agent, or Firm*—Ked & Associates LLP

(57) ABSTRACT

An interworking apparatus includes an IP sending/receiving unit coupled to an IP network, an AAL2 sending/receiving circuit coupled to a WCDMA network, and a data processing circuit between the IP sending/receiving unit and AAL2 sending/receiving unit. The data processing circuit processes data in a format suitable for interworking between the WCDMA network and IP network.

35 Claims, 9 Drawing Sheets

FIG. 4

| 7 | 6 | 5 | 4 | 3 | 2 | 1 | 0 | Byte |
|---|---|---|---|---|---|---|---|---|
| UDF ||||||||  1 |
| UDF ||||||||  2 |
| GFC/VPI |||| VPI |||| 3 |
| VPI |||| VCI |||| 4 |
| VCI ||||||||  5 |
| VCI ||| PTI ||| CLP | | 6 |
| HEC ||||||||  7 |
| UDF ||||||||  8 |
| Start Field ||||||||  9 |
| Payload [1:47] ||||||||  10-56 |

FIG. 5

| 7 | 6 | 5 | 4 | 3 | 2 | 1 | 0 | Byte |
|---|---|---|---|---|---|---|---|---|
| VPI ||||||||  1 |
| VPI ||||||||  2 |
| VCI ||||||||  3 |
| VCI ||||||||  4 |
| Start Field ||||||||  5 |
| Payload [1:47] ||||||||  6-52 |

OSF : Offset Field(6 bits)
SN : Sequence Number(1 bit)
P : Parity(odd)(1 bit)
PAD : Padding(0 ~ 47 octets)

| | | | |
|---|---|---|---|
| CID | Channel Identifier | (8 bits) | |
| LI | Length Indicator | (6 bits) | |
| UUI | User-to-User Indication | (5 bits) | |
| HEC | Header Error Control | (5 bits) | |
| CPS-INFO | Information | (1 .. 45/64 octets) | |

| 7 | 6 | 5 | 4 | 3 | 2 | 1 | 0 | Byte |
|---|---|---|---|---|---|---|---|---|
| Connection ID High byte ||||||||| 1 |
| Connection ID Low byte ||||||||| 2 |
| Data Size High byte ||||||||| 3 |
| Data Size Low byte ||||||||| 4 |
| Data + No UP Header ||||||||| 4 - 164 |

FIG. 10

| Bits | | | | | | | | Number of Octets | |
|---|---|---|---|---|---|---|---|---|---|
| 7 | 6 | 5 | 4 | 3 | 2 | 1 | 0 | | |
| PDU Type (=0) | | | | Frame Number | | | | 1 | Frame Control Part |
| FQC | | | RFCI | | | | | 1 | |
| Header CRC | | | | | | Payload CRC | | 2 | Frame Check Sum Part |
| Payload CRC | | | | | | | | | |

FIG. 11

| Bits | | | | | | | | Number of Octets | |
|---|---|---|---|---|---|---|---|---|---|
| 7 | 6 | 5 | 4 | 3 | 2 | 1 | 0 | | |
| PDU Type (=1) | | | | Frame Number | | | | 1 | Frame Control Part |
| FQC | | | RFCI | | | | | 1 | |
| Header CRC | | | | | | Spare | | 1 | Frame Check Sum Part |

FIG. 12

| 7 | 6 | 5 | 4 | 3 | 2 | 1 | 0 | Byte |
|---|---|---|---|---|---|---|---|------|
| Connection ID High byte ||||||||  1 |
| Connection ID Low byte ||||||||  2 |
| Data Size High byte ||||||||  3 |
| Data Size Low byte ||||||||  4 |
| Data + UP Header ||||||||  5 - 204 |

FIG. 13

| 7 | 6 | 5 | 4 | 3 | 2 | 1 | 0 | Byte |
|---|---|---|---|---|---|---|---|------|
| Connection ID High byte ||||||||  1 |
| Connection ID Low byte ||||||||  2 |
| Data Size High byte ||||||||  3 |
| Data Size Low byte ||||||||  4 |
| RTP Header ||||||||  5 - 16 |
| Data + UP Header ||||||||  17 - 216 |

FIG. 14

| 7 | 6 | 5 | 4 | 3 | 2 | 1 | 0 | Byte |
|---|---|---|---|---|---|---|---|------|
| Ethernet Header ||||||||  1 - 14 |
| IP Header |||||||| 15 - 34 |
| TCP Header |||||||| 35 - 54 |
| UDP Header |||||||| 55 - 82 |
| RTP Header |||||||| 83 - 94 |
| Data + UP Header |||||||| 95 - 294 |

INTERWORKING APPARATUS AND METHOD FOR ACCEPTING IP IN WCDMA SYSTEM

BACKGROUND OF THE INVENTION

1. Field of the Invention

The present invention relates to communication systems, and more particularly to an apparatus and method for performing an interworking function between at least two networks.

2. Description of the Related Art

Many networks differ in terms of their communication protocols. For example, in a wideband code division multiple access (WCDMA) network, voice and/or video data is forwarded to an AAL2 (ATN adaptation layer 2) cell. In an IP network, voice data is forwarded using a voice over IP (VoIP) service, where IP stands for Internet Protocol. VoIP is a term used in IP telephony for a set of facilities that deliver voice information using an Internet Protocol. Typically, this involves sending voice information in digital form in discrete packets, rather than according to traditional protocols of, for example, a public switched telephone network (PSTN).

FIG. 1 is a diagram of a typical VoIP network. As shown, a codec and IP connection device are connected to the IP network. In such a configuration, signals (e.g., voice or fax) are processed in a data format compatible with the IP network and then are sent through the IP network. The codec encodes voice or fax data into packets having a predetermined length in one direction, and decodes packetized data into voice or fax data in a reverse direction.

In one direction, the IP connection device (A) sends the data packetized in the codec over the IP network to another IP connection device (B) performing a VoIP function. In the reverse direction, the IP connection device (A) receives packets from the other IP connection device (B) over the IP network and forwards them to the codec.

FIG. 2 is a diagram of an AAL2 in a WCDMA system. As shown, a codec and an AAL2 (ATM adaptation layer Type 2) data processor are connected to a WCDMA network. In such a configuration, voice and/or video signals are processed in a data format compatible with the WCDMA network and then sent through the WCDMA network. In this system, the codec encodes voice and/or video data into packets of a predetermined length for transmission on the network, and decodes packets received from the network into voice and/or video data.

The AAL2 data processor assembles data from the codec into an AAL2 cell, and then forwards the cell for transmission over the WCDMA network. When an AAL2 cell is received from an AAL2 data processor of another station, it is disassembled into data packets, and then the codec decodes the packets back into voice and/or video data.

From the foregoing discussion, it is therefore apparent that each communication network performs data transmissions based only on their own protocols. That is, a VoIP network can implement voice service only with terminals that can access that VoIP network. Similarly, a WCDMA network can implement voice and/or video services only with terminals that can access that WCDMA network. There is no provision that will allow voice or data service to be provided through VoIP and WCDMA networks. Thus, when it is desirable to send data (e.g., voice, fax, video, etc.) from one type of network to another, no compatibility exists between the networks to do so.

SUMMARY OF THE INVENTION

An object of the invention is to solve at least the above problems and/or disadvantages and to provide at least the advantages described hereinafter.

Another object of the present invention is to provide an interworking apparatus and method for providing communications between a WCDMA network and an IP network.

To accomplish these and other objects and advantages, the present invention provides in accordance with one embodiment an interworking apparatus for accepting an IP in a WCDMA system, comprising: an AAL2 sending/receiving unit for sending and receiving data between a WCDMA network and a data processing unit; a data processing unit for processing data in a format suitable for interworking between the WCDMA network and the IP network; and an IP sending/receiving unit for sending and receiving data to/from the data processing unit and the IP network.

Preferably, the data processing unit comprises: an AAL2 processing unit for separating CPS packets from an ATM payload and assembling the CPS packets into the ATM payload; a UP protocol processing unit for adding or removing an UP protocol header to or from data of the CPS packet payload; an RTP processing unit for adding or removing a RTP header; and an IP processing u nit for adding a UDP header and an IP header to data inputted from the RTP processing unit and removing the UDP header and the IP header from data inputted from the IP processing unit.

In accordance with another embodiment, the present invention provides an interworking method for accepting an IP in a WCDMA system, in which data is sent and received from a first WCDMA network to an IP network, according to the present invention, comprising the steps of: (a) including a UDF in data and sending the same to a WCDMA network; (b) changing the header of the data and delivering the data; (c) delivering the data processed by separating CPS packets from an ATM payload; (e) delivering the data processed by adding a RTP header to the processed data; (f) delivering the data processed by adding a UDP header and an IP header to the processed data; and (g) forwarding the data processed by adding an Ethernet header to the processed data to the IP network.

Preferably, in the case that data is sent and received to a second WCDMA network from the first WCDMA network via the IP network, the interworking method further comprises the step of (d) delivering the data processed by adding a UP protocol header to the processed data between the step (c) and the step (e).

Preferably, in the case that data is data is sent and received to a second WCDMA network from the first WCDMA network via the IP network, the interworkign method further comprises the steps of: (h) receiving the data passed through the IP network; (i) delivering the data processed by removing the Ethernet header from the received data; (j) delivering the data processed by removing the UDP header and the IP header from the processed data; (k) delivering the data processed by removing the RTP header from the processed data; (l) delivering the data processed by removing the UP protocol header from the processed data; (m) delivering the data processed by assembling CPS packets in to the ATM payload; (n) changing the header in the data format and delivering the data; and (o) including a UDF in the data and sending the same to the WCDMA network.

Additional objects, advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a format of a data interface with a WCDMA system according to one embodiment of the present invention;

FIG. 5 is a data format between an AAL2 sending/receiving unit and an AaL2 processing unit according to one embodiment of the present invention;

FIG. 10 and FIG. 11 are examples of formats of a UP protocol header according to one embodiment of the present invention;

FIG. 12 is an example of a data format between the UP protocol processing unit and an RTP processing unit according to one embodiment of the present invention;

FIG. 13 is an example of a data format between the RTP processing unit and an IP processing unit according to one embodiment of the present invention;

FIG. 14 is an example of a format of a data interface between an IP sending/receiving unit and an IP system according to the embodiment of one present invention.

DETAILED DESCRIPTION OF THE INVENTION

In accordance with one embodiment, the present invention processes the format of data in two networks to achieve an interworking function between the networks. The two networks are preferably a WCDMA network and an IP network. In one way, the present invention may implement this interworking function by supporting the Support mode of a UP (user plane) protocol for accepting voice or video within an IP and converting the voice or video's UP (refer to 3GPP TS 25.415) data into an AAL2 (ATM adaptation layer Type 2) cell, which is a basic data format of the system. Other techniques may also be performed in accordance with the present invention.

Figure 1:
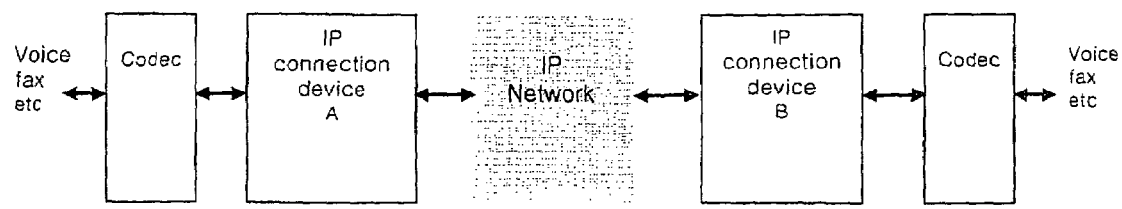
FIG. 1 is a diagram of a typical VoIP network.
Figure 2:
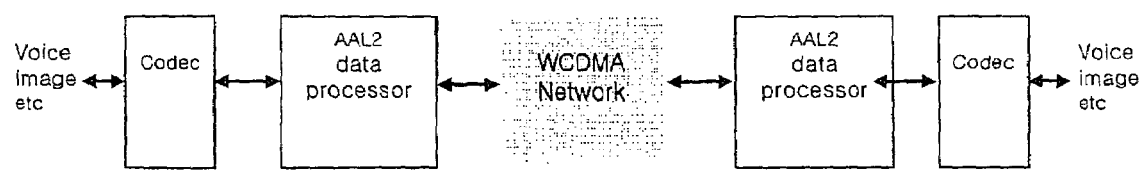
FIG. 2 is a diagram of an AAL2 in a WCDMA system.
Figure 3:
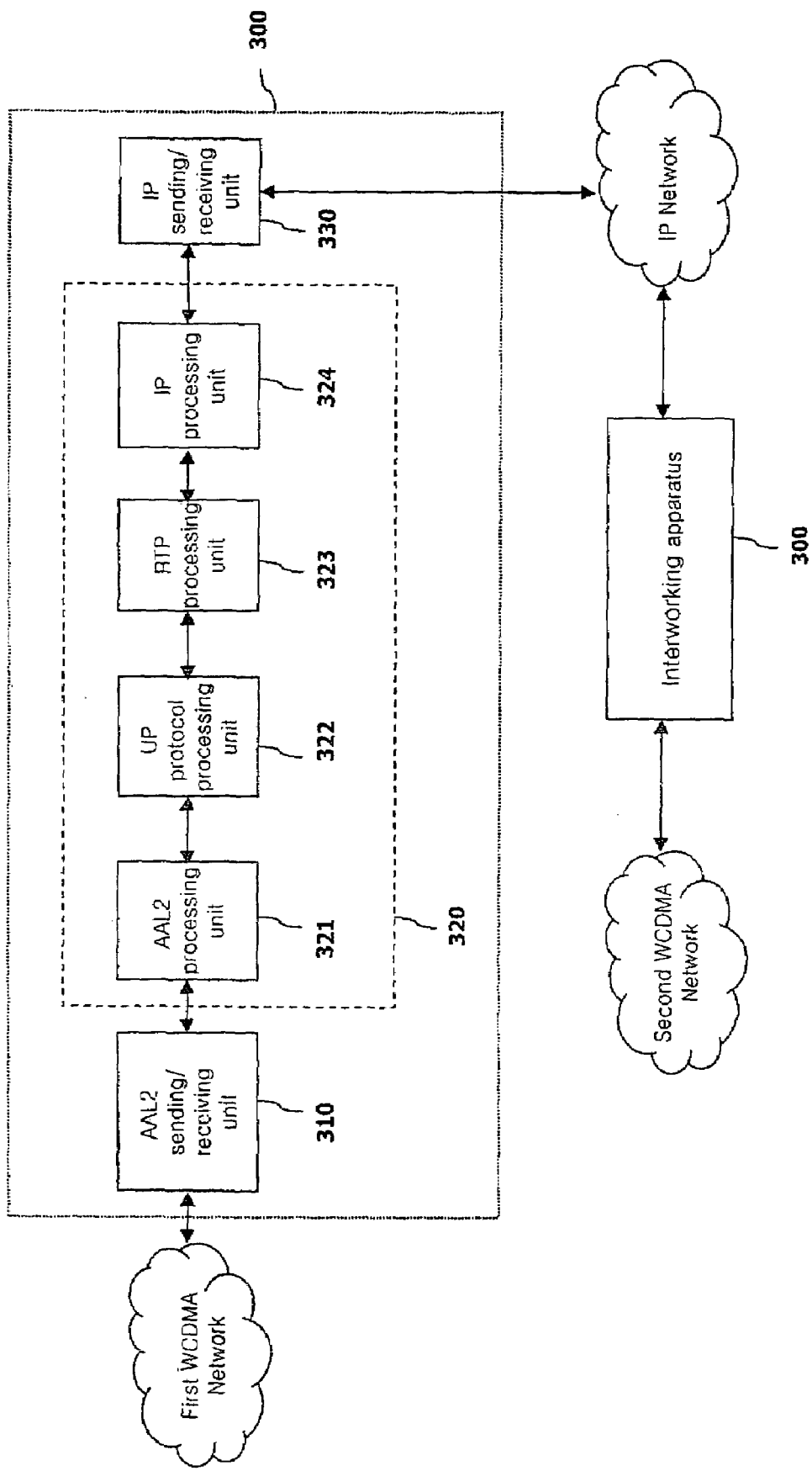
FIG. 3 is a diagram of an interworking apparatus between a WCDMA network and an IP network according to one embodiment of the present invention.

FIG. 3 shows an interworking apparatus between a WCDMA network and an IP network according to one embodiment of the present invention. This interworking apparatus 300 processes data for interwoking between a WCDM network and an IP network. The apparatus includes an AAL2 sending/receiving unit 310, a data processing unit 320, and an IP sending/receiving unit 330. The AAL2 sending/receiving unit sends and receives data between the WCDMA network and the data processing unit 320. The data processing unit 320 processes data in a format suitable for interworking between the WCDMA network and the IP network. And, the IP sending/receiving unit 330 sends and receives data to/from the data processing unit and the IP network.

The data processing unit 320 comprises an AAL2 processing unit 321, a UP protocol processing unit 322, a RTP processing unit 323, and an IP processing unit 324.

The AAL2 sending/receiving unit 310 sends and receives data of an ATM data format including a UDF (user define field) to and from a WCDMA system, and sends and receives data of the ATM data format whose header is changed to and from the AAL2 processing unit 321.

The AAL2 processing unit 321 separates CPS (common part sublayer) packets from the ATM payload of the data received from the AAL2 sending/receiving unit 310, or assembles CPS packets from the data received from the UP (user plane) protocol processing unit 322 into the ATM payload.

The UP protocol processing unit 322 adds a UP protocol header to the data of the CPS packet payload received from the AAL2 processing unit 321, or removes the UP protocol header from the data received from the RPT processing unit 323.

The RPT processing unit 323 acquires RTP header information from the connection ID of the data received from the UP protocol processing unit 322 to add a RTP header, or removes the RTP header from the data received from the IP processing unit 324.

The IP processing unit 324 adds an UDP header and an IP header to the data received from the RTP processing unit 323, or removes the UDP header and the IP header from the data received from the IP sending/receiving unit 330.

The IP sending/receiving unit 330 adds an Ethernet header to the data received from the IP processing unit 324 to send the data to the IP network, or removes the Ethernet header from the data received from the IP network to send it to the IP processing unit 324.

The interworking apparatus 300 processes and delivers data from a WCDMA network to an IP network, and on the contrary, processes and delivers data from the IP network. The interworking apparatus also processes and delivers data from the IP network to the WCDMA network. Further, the interworking apparatus may also interwork between the WCDMA network and the IP network, for the purpose of processing and delivering data from one WCDMA network to another WCDMA network via the IP network.

Hereinafter, the functions and operation of interworking apparatus 300 will be described with reference to the accompanying drawings. The description will be made with respect to the format of data processed in a series of components of the interworking apparatus.

As illustrated in FIG. 3 to deliver data (e.g., voice or video) from a subscriber of a first WCDMA network to a subscriber of an IP network, first the data included in the payload field of an AAL2 (ATM adaptation layer type 2) is packetized and delivered to the AAL2 sending/receiving unit 310. Here, the AAL2 cell refers to the format of ATM data sent and received in the WCDMA network.

The AAL2 sending/receiving unit 321 receives from the WCDMA network data added with a UDF (user define field)

in a basic ATM cell format interfacing with the WCDMA system, as illustrated in FIG. 4.

As illustrated in FIG. 5, the AAL2 sending/receiving unit 321 changes the header of the received data in the ATM cell format into a header consisting of a VPI (virtual path identifier) of at least 1 byte and a VCI (virtual channel identifier) of at least 1 byte and sends it to the AAL2 processing unit 321. Here, the UDF field contains transmission information such as port number, and the VPI and VCI contain information on virtual path and channel through which data of the ATM cell format are to be transmitted.

The AAL2 processing unit 321 separates CPS packets from the payload field of the transmitted ATM cell. At this time, the operation of separating CPS packets from the payload field of the ATM cell differs according to the manner in which the CPS packets are loaded on the ATM cell. Hereinafter, the operation of separating CPA packets will be described in more detail with reference to the accompanying drawings.

Figure 6:
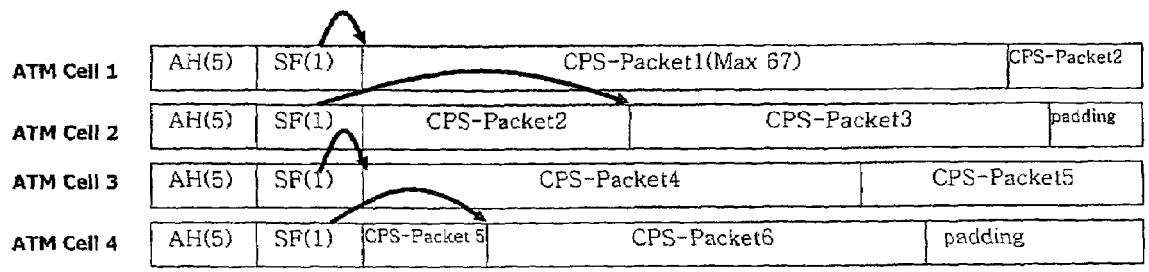
FIG. 6 is an example of an ATM cell data format according to one embodiment of the present invention.
Figure 7:
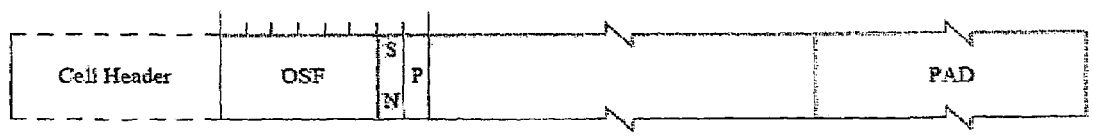
FIG. 7 is a Start Field format of an ATM cell according to one embodiment of the present invention.
Figures 8, 9:
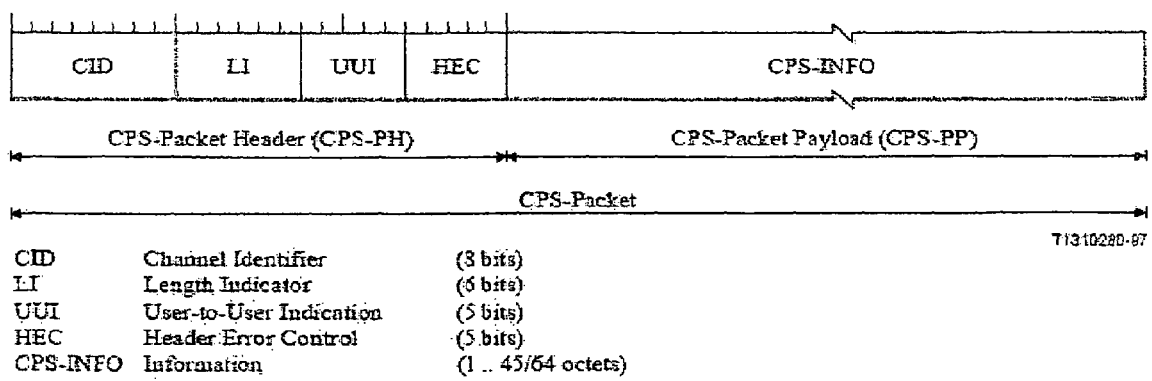
FIG. 8 is an example of a CPA packet format according to one embodiment of the present invention.
FIG. 9 is an example of a data format between the AAL2 processing unit and an UP protocol processing unit according to one embodiment of the present invention.

FIG. 6 is an ATM cell data format in which the format of CPS packets separated from the payload filed of an ATM cell is illustrated. FIG. 7 is a view illustrating a Start Field format of the ATM cell of FIG. 6 in detail. FIG. 8 is a view illustrating a CPA packet format of the ATM cell of FIG. 6.

As illustrated in FIG. 6, one ATM cell consists of an AH (ATM header) of 5 bytes, a SF (Start Field) of 1 byte and CPS packets. The one ATM cell may contain one or more CPS packets. As illustrated in FIG. 7, the Start Field of the ATM cell contains an Offset Field and a SN (Sequence Number). Each of the CPS packets as illustrated in FIG. 8 consists of a CPS-packet header (CPS-PH) and a CPS-packet payload (CPS-PP).

Referring to FIGS. 5 to 8, the offset field of the start field indicates the position where a new CPOS packet is located in the payload of 47 bytes from which the offset field is subtracted. For example, if the offset value is 0, a new CPS packet indicates the next byte of the start field. If the offset value is 47, this means that the CPS packets are completed in the current cell and thus there is not new CPS packet or the current CPS packets are included until the next cell. The position indicated by the arrow of each cell as illustrated in FIG. 6 means the position indicated by the offset value.

Therefore, the AAL2 processing unit 321 separates CPS packets using the offset value of the start field. At this point the CPS packets separated from the ATM cell contains a CPS packet header as illustrated in FIG. 8, but the CPS packet header is separated before the CPS packets are sent to the UP protocol processing unit 322. If the data initially transmitted from the first WCDMA network is image data, there may occur the case where two or more CPS packets are combined and sent to the UP protocol processing unit 322. For this case, a buffer is allocated to a corresponding subscriber and previous data is stored until a complete image data packet is assembled.

To summarize the operation of the AAL2 processing unit 321, CPS packets are separated from the ATM payload, CPS packet payload data in the separated CPS packets are processed in a data format as in FIG. 9, and sent to the UP protocol processing unit 322. Here, a connection ID as illustrated in FIG. 9 may be a table allocated for managing subscriber information for processing data in each processing unit, which integrally manages subscriber information such as a CID (channel identifier), VPI, VCI, etc. required in each processing unit.

The data format illustrated in FIG. 9 is added with a UP protocol-related header in the UP protocol processing unit 322, and sent to the RTP processing unit 323 in a data format as illustrated in FIG. 12. At this time, the CPS packet payload of voice in the data inputted from the AAL2 processing unit 322 contains a UP header, and thus any particular operation of generating a UP header is not required. However, since the CPS packet payload of image does not contain a UP header, UP header information is acquired from a connection ID.

FIG. 10 and FIG. 11 are views showing a UP header type generated based on the UP header information acquired from the connection ID. The thus-generated UP header is included in the data format as illustrated in FIG. 12, and the data format is sent to the RTP processing unit 323.

The RTP processing unit 323 receives an input of the data format, acquires RTP header information from the connection ID of the data format, generates a RTP header, and thereafter delivers the data format as illustrated in FIG. 13 to the IP processing unit 324. The data format processed through the RTP processing unit 323 from the AAL2 sending/receiving unit 310 becomes a data format suitable for the IP network.

The IP processing unit 324 adds a UDP header and an IP header to the data delivered from the RTP processing unit 323 and sends it to the IP sending/receiving unit 330. Next, the IP sending/receiving unit 330 may generate an Ethernet header in the data delivered from the IP processing unit 323, and deliver the data of the type as shown in FIG. 14 to a second WCDMA network via the IP network.

At this point, operation of processing and sending data from the IP network to the second WCDMA network is performed in a reverse order of the aforementioned operation of processing and sending data from the first WCDMA network to the IP network. Therefore, each processing unit of the interworking apparatus 300 processes the above-described data processing procedure in reverse, and delivers the processed data to the second WCDMA network from the IP network. That is, the IP sending/receiving unit 330 removes the Ethernet header from the data sent via the IP network and sends it to the IP processing unit 324. The IP processing unit 324 removes the UDP header and the IP header from the data delivered from the IP sending/receiving unit 330 and sends it to the RTP processing unit 323.

The RTP processing unit 323 removes the RTP header from the data delivered from the IP processing unit 324 and sends it to the UP protocol processing unit 322. Then, the UP protocol processing unit 322 removes the UP protocol-related header from the data of the CPS packet payload delivered from the RTP processing unit 323 and sends it to the AAL2 processing unit 321.

Next, the AAL2 processing unit 321 generates a Start Field containing an offset value, assembles CPS packets containing data of the CPS packet payload in an ATM payload, and sends an a TM cell generated by assembling to the AAL2 sending/receiving unit 310.

Next, the AAL2 sending/receiving unit 310 removes the UDF added to the delivered ATM cell, and sends the ATM cell from which the UDF is removed to the second WCDMA network. By this operation of the interworking apparatus, data such as voice, video or image can be transmitted to the first WCDMA network to the second WCDMA network via the IP network.

In another embodiment of the present invention where the interworking apparatus 300 operates between a WCDMA network and an IP network, UP protocol processing unit 322 does not need to generate a UP protocol header and add it to data. By such an operation, the connection ID in the data delivered to the UP protocol processing unit 322 is retrieved, whereby the necessity of generation of a UP protocol header can be found.

Figure 15:
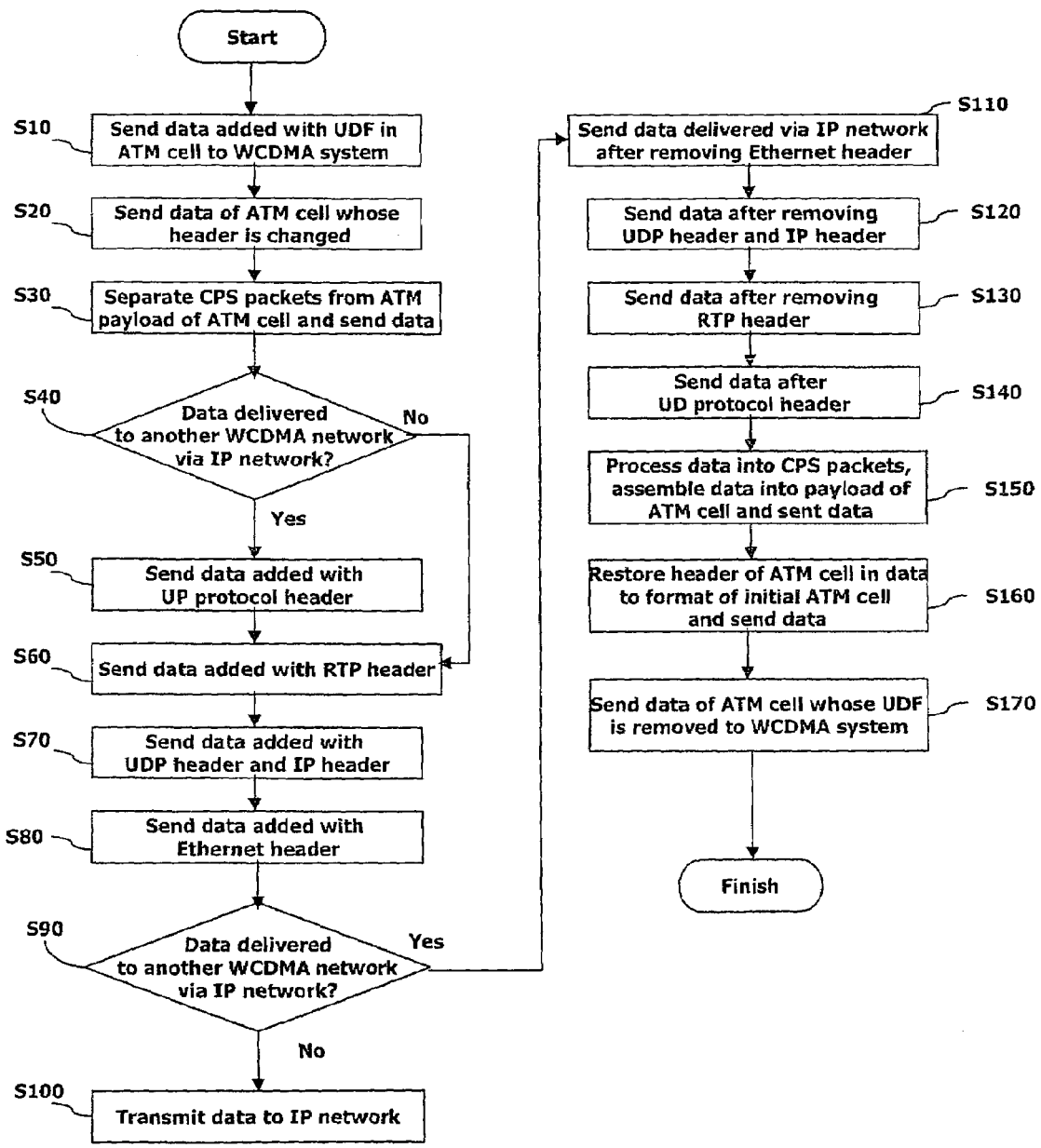
FIG. 15 is a sequence chart showing steps included in an interworking method between a WCDM network and an IP network according to one embodiment of the present invention.

The interworking apparatus thus operated according to the present invention will be described with reference to the sequence chart as shown in FIG. 15. To send and receive data such as voice or image by interworking from a WCDMA network to an IP network, data added with a UDF in an ATM cell of the WCDMA network is sent to a WCDMA system (S10). Also, data of an ATM cell format including a header changed so as to be comprised of a VPI and VCI is delivered (S20).

The data processed by separating CPS packets from the ATM payload filed of the ATM cell of the step S20 is delivered (S30). It is then judged whether the processed data is data delivered to the IP network or data delivered to another WCDMA network via the IP network (S40). At this time, the judgment (S40) is based on connection ID information of the ATM cell. If the data is data delivered to another WCDMA network via the IP network, an UP protocol header is added to the data delivered in the step (S30) is and sent, and if the data is data delivered merely to the IP network, no UP protocol header is added and the data delivered in the step S30 is sent (S50).

The data delivered in the step S50 is added with a RTP header (S60). When the data is added with a UDP header and an IP header and sent (S70), the data further added (S80) with an Ethernet header is processed and delivered to the IP network (S100).

However, the data of the step S80 is data transmitted to another WCDMA network via the IP network (S90). The series of steps S10 to S80 are then performed in reverse. That is, the data processed by removing the Ethernet header from the data acquired in the step S80 is sent (S110), and the UDP header and the IP header are removed from the data (S120).

The data of the step S120 is processed and sent after removing the RTP header and the UP protocol header (S130 and S140). Next, the data of the step S140 is processed into CPS packets, and the CPS packets are assembled into the payload of the ATM cell (S150). The header of the assembled ATM cell is restored to a format corresponding to the header of the initial ATM cell and the restored ATM cell is sent (S160). The initially added UDF is removed from the data of the ATM cell format of the step S160 (S170), and the data is transmitted to another WCDMA network.

As described above, the present invention has the effect of accepting VoIP communications in a WCDMA network. Accordingly, a wider variety of content can be provided to subscribers and reliability of service can be improved. Furthermore, a WCDMA network and an IP network can made to interwork between one another, and thus a router as well as a WCDMA system can be added to a network configuration to thereby reduce the cost of building a network configuration infrastructure.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An interworking apparatus, comprising:
   an internet protocol (IP) sending/receiving unit coupled to an IP network;
   an ATM adaptation layer (AAL)2 sending/receiving circuit coupled to a wideband code division multiple access (WCCDMA) network; and
   a data processing circuit between the IP sending/receiving unit and AAL2 sending/receiving unit, the data processing circuit processing data in a format suitable for interworking between the WCDMA network and IP network, wherein the data processing unit comprises:
   an AAL2 processing unit to separate CPS packets from an ATM payload when data is received from the AAL2 sending and receiving unit, and to assemble CPS packets into an ATM payload when data is received from the IP network;
   a user plane (UP) protocol processing unit to add or remove an UP protocol header to or from data of the CPS packet payload;
   a real-time transport protocol (RTP) processing unit to add or remove a RTP header; and
   an IP processing unit to add a user datagram protocol (UDP) header and an IP header to data input from the RTP processing unit, and remove the UDP header and the IP header from data input from the IP processing unit, wherein, if the data delivered from the AAL2 processing unit is voice data, the UP protocol processing unit delivers the delivered data to the RTP processing unit without adding an UP protocol header thereto.

2. The apparatus of claim 1, wherein data sent between the AAL2 sending/receiving unit and the WCDMA network is an asynchronous transfer mode (ATM) cell format.

3. The apparatus of claim 2, wherein the ATM cell format includes a user define field (UDF), virtual path identifier (VPI), virtual channel identifier (VCI), Start Field and Payload.

4. The apparatus of claim 3, wherein the UDF is added so as to send a port number.

5. The apparatus of claim 1, wherein the data sent between the AAL2 sending/receiving unit and data processing unit is in an ATM cell format having a changed header.

6. The apparatus of claim 5, wherein the header of the ATM cell includes a VPI of at least 1 byte and a VCI of at least 1 byte.

7. The apparatus of claim 5, wherein the ATM cell format includes a VPI, VCI, Start Field and Payload.

8. The apparatus of claim 1, wherein the AAL2 processing unit separates CPS packets from data delivered from the AAL2 sending/receiving unit and thereafter delivers processed data to the UP protocol processing unit.

9. The apparatus of claim 1, wherein the AAL2 processing unit processes Data field data of the data delivered from the UP protocol processing unit into CPS packets and thereafter assembles the CPS packets into an ATM cell payload and delivers them to the AAL2 sending/receiving unit.

10. The apparatus of claim 1, wherein the UP protocol processing unit retrieves a connection ID field in the data delivered from the AAL2 processing unit and generates a UP protocol header.

11. The apparatus of claim 1, wherein, if the data delivered from the AAL2 processing unit is image data, the UP protocol processing unit delivers the delivered data to the RTP processing unit after adding an UP protocol header thereto.

12. The apparatus of claim 1, wherein, if the data delivered from the RTP processing unit is image data, the UP protocol processing unit delivers the delivered data to the AAL2 processing unit after removing the UP protocol header therefrom.

13. The apparatus of claim 1, wherein the RTP processing unit adds a RTP header to the data delivered from the UP protocol processing unit and delivers the data to the IP processing unit.

14. The apparatus of claim 13, wherein the RTP processing unit acquires RTP header information from the connection ID included in the data delivered from the UP protocol processing unit and forms the RTP header for data processing.

15. The apparatus of claim 1, wherein the RTP processing unit adds the RTP header from the data delivered from the IP processing unit and delivers the data to the UP protocol processing unit.

16. The apparatus of claim 1, wherein the IP processing unit adds an UDP header and an IP header to the data delivered from the RTP processing unit and then performs data processing for delivering the data to the IP sending/receiving unit.

17. The apparatus of claim 1, wherein the IP processing unit removes the UDP header and the IP header from the data delivered from the IP sending/receiving unit and then performs data processing for delivering the data to the RTP processing unit.

18. The apparatus of claim 1, wherein the data sent and received between the AAL2 processing unit and the UP protocol processing unit has an ATM data format containing a connection ID field, Data Size field and a Data field corresponding to a common part sub-layer (CPS) packet payload.

19. The apparatus of claim 1, wherein the data sent and received between the RTP processing unit and the IP processing unit has a data format which further includes a RTP header in the data format sent and received between the UP protocol processing unit and the RTP processing unit.

20. The apparatus of claim 1, wherein the IP sending/receiving unit adds an Ethernet header to the data delivered from the IP processing unit, and thereafter delivers the data to the IP network.

21. The apparatus of claim 1, wherein the IP sending/receiving unit removes an Ethernet header from the data delivered from the IP network, and thereafter delivers the data to the IP processing unit.

22. The apparatus of claim 1, wherein the data sent and received between the IP sending/receiving unit and the IP network has a data format which further includes an Ethernet header in the data sent and received between the IP processing unit and the IP sending/receiving unit.

23. An interworking apparatus, comprising:
an internet protocol (IP) sending/receiving unit coupled to an IP network;
an ATM adaptation layer (AAL)2 sending/receiving circuit coupled to a wideband code division multiple access (WCDMA) network; and
a data processing circuit between the IP sending/receiving unit and AAL2 sending/receiving unit, the data processing circuit processing data in a format suitable for interworking between the WCDMA network and IP network, wherein the data processing unit comprises:
an AAL2 processing unit to separate CPS packets from an ATM payload when data is received from the AAL2 sending and receiving unit, and to assemble CPS packets into an ATM payload when data is received from the IP network;
a user plane (UP) protocol processing unit to add or remove an UP protocol header to or from data of the CPS packet payload;
a real-time transport protocol (RTP) processing unit to add or remove a RTP header; and
an IP processing unit to add a user datagram protocol (UDP) header and an IP header to data input from the RTP processing unit, and remove the UDP header and the IP header from data input from the IP processing unit,
wherein the data sent and received between the AAL2 processing unit and the UP protocol processing unit has an ATM data format containing a connection ID field, Data Size field and a Data field corresponding to a common part sub-layer (CPS) packet payload, and wherein the connection ID field contains subscriber information acquired from a virtual path identifier (VPI), virtual channel identifier (VCI) and a channel identifier (CID).

24. An interworking apparatus, comprising:
an internet protocol (IP) sending/receiving unit coupled to an IP network;
an ATM adaptation layer (AAL)2 sending/receiving circuit coupled to a wideband code division multiple access (WCDMA) network; and
a data processing circuit between the IP sending/receiving unit and AAL2 sending/receiving unit, the data processing circuit processing data in a format suitable for interworking between the WCDMA network and IP network, wherein the data processing unit comprises:
an AAL2 processing unit to separate CPS packets from an ATM payload when data is received from the AAL2 sending and receiving unit, and to assemble CPS packets into an ATM payload when data is received from the IP network;
a user plane (UP) protocol processing unit to add or remove an UP protocol header to or from data of the CPS packet payload;
a real-time transport protocol (RTP) processing unit to add or remove a RTP header; and
an IP processing unit to add a user datagram protocol (UDP) header and an IP header to data input from the RTP processing unit, and remove the UDP header and the IP header from data input from the IP processing unit, wherein the data sent and received between the UP protocol processing unit and the RTP processing unit has an ATM data format which further includes an UP header in the data format sent and received between the AAL2 processing unit and the UP protocol processing unit.

25. An interworking apparatus, comprising:
an internet protocol (IP) sending/receiving unit coupled to an IP network;
an ATM adaptation layer (AAL)2 sending/receiving circuit coupled to a wideband code division multiple access (WCDMA) network; and
a data processing circuit between the IP sending/receiving unit and AAL2 sending/receiving unit, the data processing circuit processing data in a format suitable for interworking between the WCDMA network and IP network, wherein the data processing unit comprises:
an AAL2 processing unit to separate CPS packets from an ATM payload when data is received from the AAL2 sending and receiving unit, and to assemble CPS packets into an ATM payload when data is received from the IP network;
a user plane (UP) protocol processing unit to add or remove an UP protocol header to or from data of the CPS packet payload:
a real-time transport protocol (RTP) processing unit to add or remove a RTP header; and
an IP processing unit to add a user datagram protocol (UDP) header and an IP header to data input from the RTP processing unit, and remove the UDP header and the IP header from data input from the IP processing unit, wherein the data sent and received between the IP processing unit and the IP sending/receiving unit has a data format containing a Data field corresponding to a common part sub-layer (CPS) packet payload, a user plane (UP) header, a real-time transfer protocol (RTP) header, a user datagram protocol (UDP) header and an IP header.

26. An interworking apparatus, comprising:

an ATM adaptation layer (AAL)2 sending/receiving unit which sends and receives data of an asynchronous transfer mode (ATM) data format including a user define field (UDF) to and from a wideband code division multiple access (WCDMA) system, and sends and receives data of the ATM data format whose header is changed to and from a AAL2 processing unit;

the AAL2 processing unit separating common part sub-layer (CPS) packets from the ATM payload of the data received from the AAL2 sending/receiving unit, or assembling CPS packets from the data received from a user plane (UP), protocol processing unit into the ATM payload;

the UP protocol processing unit adding a UP protocol header to the data of the CPS packet payload received from the AAL2 processing unit, or removing the UP protocol header from the data received from a real-time transfer protocol (RTP) processing unit;

the RTP processing unit acquiring RTP header information from the connection ID of the data received from the UP protocol processing unit to add a RTP header, or removing the RTP header from the data received from an IP processing unit;

the IP processing unit adding an user datagram protocol (UDP) header and an IP header to the data received from the RTP processing unit, or removing the UDP header and the IP header from the data received from an IP sending/receiving unit; and the IP sending/receiving unit adding an Ethernet header to the data received from the IP processing unit to send the data to an IP network, or removing the Ethernet header from the data received from the IP network to send it to the IP processing unit.

27. The apparatus of claim 26, wherein data transmission interworks between a first WCDMA network and a second WCDMA network via an IP network.

28. The apparatus of claim 27, wherein, when interworking from the WCDMA network to the IP network is performed, the data processed in the UP protocol processing unit does not contain an UP header.

29. An interworking method comprising:

sending data including a user define field (UDF) to a wideband code division multiple access (WCDMA) network;

changing a header of the data;

processing the data by separating one or more common part sub-layer (CPS) packets from an asynchronous transfer mode (ATM) payload;

adding a real-time transfer protocol (RTP) header to the processed data;

adding a UDP header and an IP header to the processed data; and adding an Ethernet header to the processed data; and forwarding the data to an IP network, wherein to send and receive data to and from a second WCDMA network from the first WCDMA network via the IP network, the method further comprises:

receiving the data passed through the IP network;

removing the Ethernet header from the received data;

removing the UDP header and the IP header from the processed data;

removing the RTP header from the processed data;

removing the UP protocol header from the processed data;

assembling CPS packets in to the ATM payload;

changing the header in the data format and delivering the data; and sending the data including a UDF to the WCDMA network.

30. The method of claim 29, wherein in the case that data is sent and received to a second WCDMA network from the first WCDMA network via the IP network, the method further comprises: delivering the data processed by adding a UP protocol header to the processed data between the separating and header adding operations.

31. The method of claim 30, wherein the UP protocol header is generated by retrieving a connection ID field.

32. The method of claim 30, wherein the UP protocol header is added if the processed data is image data, and the UP protocol header is not added if the processed data is voice data.

33. The method of claim 30, wherein the changed header consists of a virtual path identifier (VPI) of at least 1 byte and a virtual channel identifier (VCI) of at least 1 byte.

34. The method of claim 29, wherein the UDF is added in order to send specific information such as port number.

35. The method of claim 29, wherein the RTP header is generated by obtaining RTP header information from the connection ID of the processed data.

* * * * *